Dec. 23, 1924.
A. H. HAPPE
ELECTRIC HEATER
Filed Feb. 6, 1922      3 Sheets-Sheet 1
1,520,241
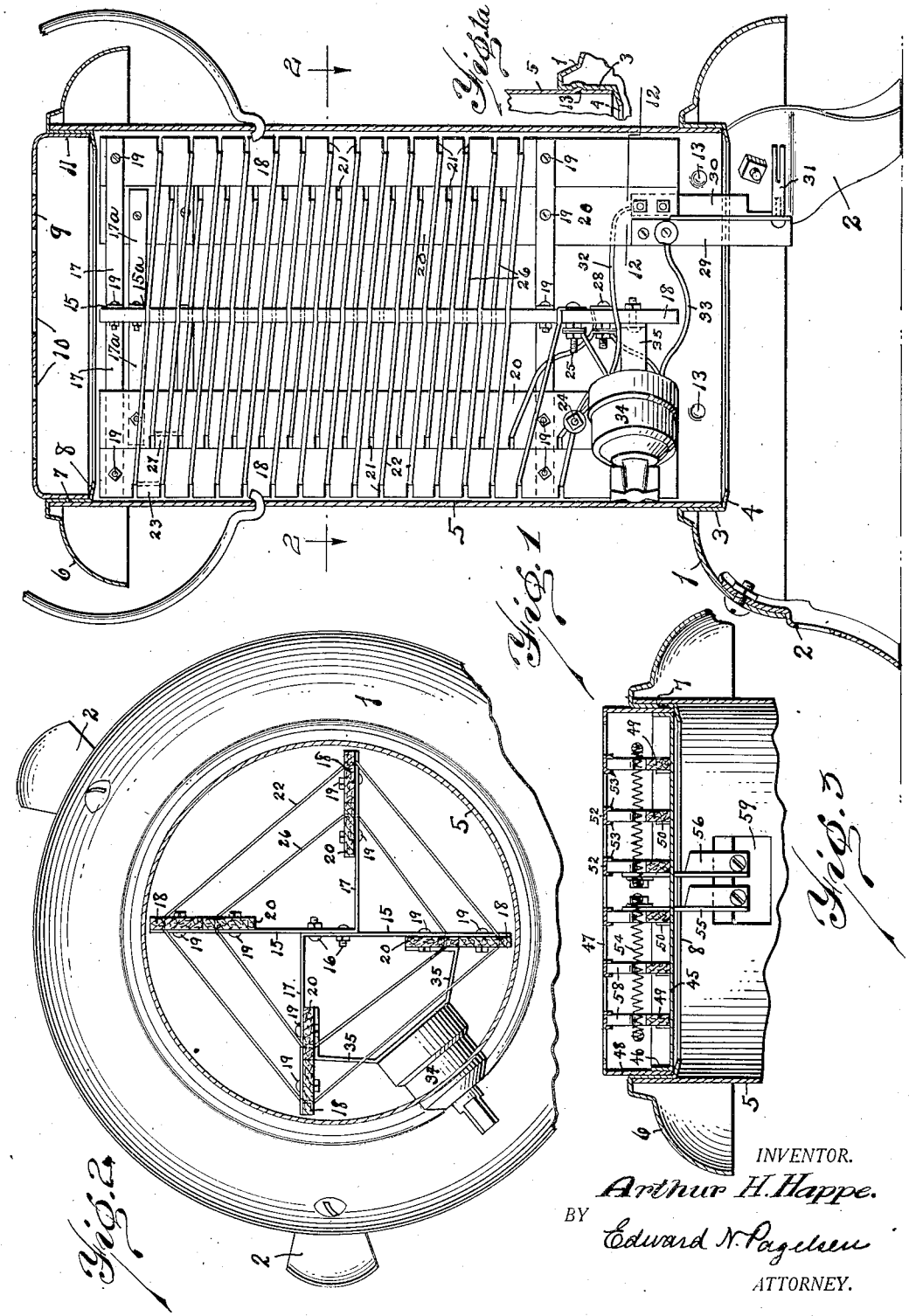
INVENTOR.
Arthur H. Happe.
BY
Edward N. Pagelsen
ATTORNEY.

Dec. 23, 1924.  1,520,241
A. H. HAPPE
ELECTRIC HEATER
Filed Feb. 6, 1922  3 Sheets-Sheet 2
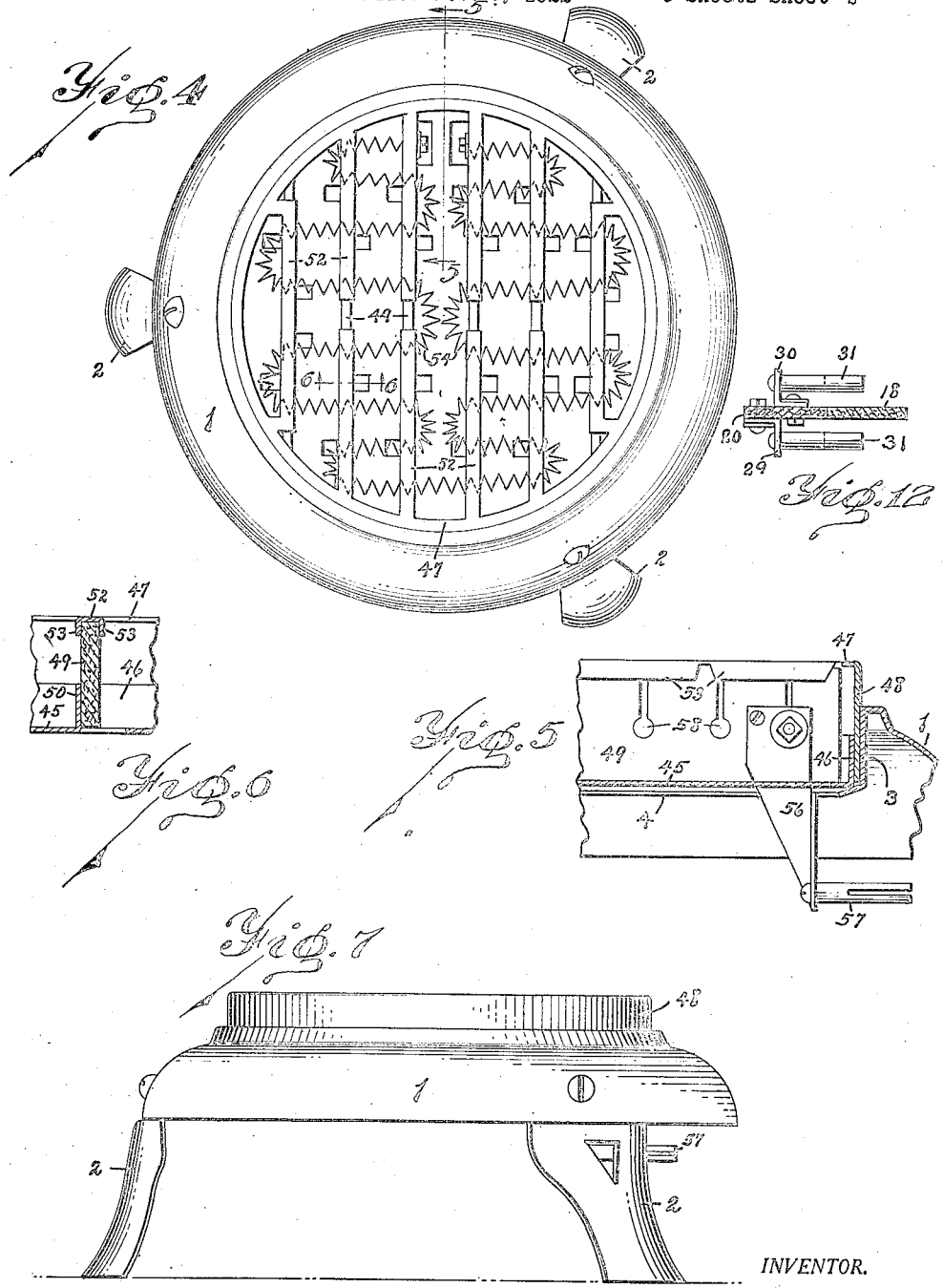
INVENTOR.
Arthur H. Happe
BY Edward N. Pagelsen,
ATTORNEY.

Dec. 23, 1924.  
A. H. HAPPE  
ELECTRIC HEATER  
Filed Feb. 6, 1922   3 Sheets-Sheet 3
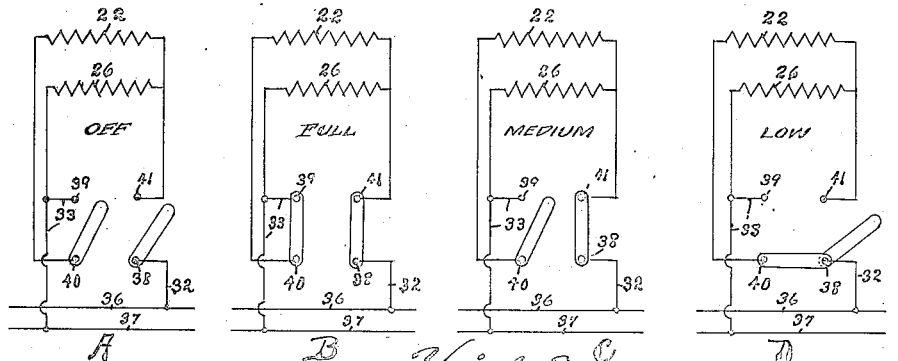
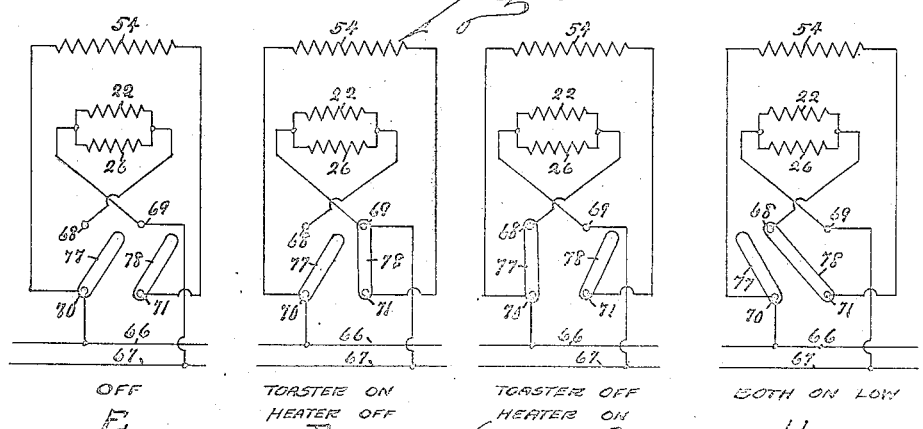
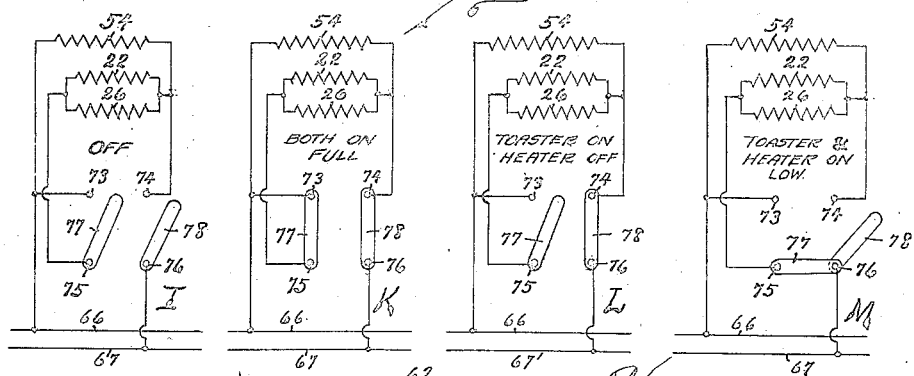
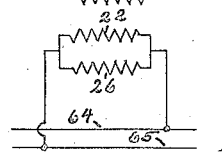
INVENTOR.  
Arthur H. Happe.  
BY Edward N. Pagelsen  
ATTORNEY.

Patented Dec. 23, 1924.

1,520,241

UNITED STATES PATENT OFFICE.

ARTHUR H. HAPPE, OF DETROIT, MICHIGAN.

ELECTRIC HEATER.

Application filed February 6, 1922. Serial No. 534,390.

*To all whom it may concern:*

Be it known that I, ARTHUR H. HAPPE, a citizen of the United States, and residing at Detroit, in the county of Wayne and State of Michigan, have invented a new and Improved Electric Heater, of which the following is a specification.

This invention relates to the construction of portable electric heaters, and its object is to provide a device of this character wherein the effective amount and the temperature of the heating wires may be varied, which can be quickly disassembled and reassembled, and which shall be provided with a toaster unit which can be mounted in the top of the assembled heater or in the base thereof when the heater is disassembled.

This invention comprises a base, a body or shell, a top, a supporting frame for the heating wire, a plurality of heating wires wound on the frame, and a switch by means of which current is directed through one of the wires alone, through the several wires in parallel or through the wires in series.

It further consists in a frame embodying a set of evenly spaced pairs of upright strips with notches in their outer edges for each heating wire.

It also consists in a heater shell and base having the same internal diameter and a toaster unit adapted to fit within said shell and base.

It also consists in a toaster unit having a perforated bottom and adapted to fit the upper end of the heater shell, the bottom having a bright upper surface to reflect the radiant heat rays received from the heating wire of the toaster unit.

It also consists in the details of construction illustrated in the accompanying drawings and particularly pointed out in the claims.

In the accompanying drawings, Fig. 1 is a central vertical section of my improved heater. Fig. 1ª is a detail of a connection between the shell and base. Fig. 2 is a section on the line 2—2 of Fig. 1. Fig. 3 is a central section showing a toaster unit mounted in the top of the heater. Fig. 4 is a plan of the toaster unit mounted in the base. Figs. 5 and 6 are sections on the lines 5—5 and 6—6 of Fig. 4 respectively. Fig. 7 is an elevation of the base with the toaster unit mounted therein. Figs. 8 to 11 inclusive are diagrams of heating wires and switches therefor. Fig. 12 is a section on the line 12—12 of Fig. 1.

Similar reference characters refer to like parts throughout the several views.

The base 1 shown in the drawings is supported on feet 2 and has a downwardly extending inner flange 3 having an inturned edge 4. The shell 5 of the heater is substantially cylindrical but may have a slight downward taper and the heater is shown to be supplied with an ornamental thimble 6. The interior of the shell may be coated with aluminum paint which reflects the dark heat rays and thus prevents overheating of the shell. This thimble may be formed with a downwardly extending flange 7 having an inturned edge 8, the inner diameter of this flange 7 being preferably the same as the inner diameter of the flange 3 of the base. The upper end of the shell may be closed by a cap 9 having any desired number of holes 10 and a cylindrical flange 11 fitting within the flange 7 on the thimble. In order to hold the base and shell together, the latter may be formed with small bosses 13 and the flange 3 on the base with corresponding recesses, as shown in Fig. 1ª, the shell being sufficiently resilient to permit the bosses 13 to be forced in until they reach these recesses.

The resistance wires are wound on upright strips of a heat resisting material which is a non-conductor of electricity, asbestos board preferred. These strips are shown mounted on metal cross-frames, made up as shown in Figs. 1 and 2 of long arms 15 secured together by bolts 16 and short arms 17 extending therefrom. The outer upright supporting strips 18 are attached to the ends of these arms of both frames by bolts 19, but the inner strips 20 are preferably attached to the lower frame alone. The strips are all formed with notches 21 in their outer edges.

The outer wire 22 is looped near its middle point over the part 23 of one strip 18 and the two parts are wound around the supporting strips until the ends reach the screws 24 and 25. The inner winding 26 is similarly started at 27 and the ends are attached to the screws 24 and 28 respectively. A third frame having somewhat shorter arms 15ª and 17ª is attached to the inner strips 20 by means of similar bolts 19. When the screws 19 attaching these strips 18 to the lower frame and the screws 24, 25 and 28 are removed, the outer strips 18 may be slid out as a unit together with the resistance wire 22 thereon. These supporting members 18 and 20 may be said to telescope.

Attached to one of the supporting strips are two light metal brackets 29 and 30 which carry contact pins 31 adapted to enter the usual coupling block whereby connection may be made with a current source. See Fig. 12. The wires 32 and 33 from these brackets 29 and 30 connect to the control switch 34. While any desired type of switch may be employed, I have shown a well known double contact switch which may be attached to the supporting strips for the resistance wires by means of the bars 35. An opening is cut in the shell 5 to permit the switch to extend through and thus the shell may support the resistance wires and the strips and frames on which the wires are mounted. As the switch is well known, no description thereof is given.

Fig. 8 illustrates diagrammatically the operation of the switch and the heating wires. The line wires 36 and 37 connect to two contact points 38 and 39 of the switch by means of wires 32 and 33. The heating element 22 connects to the contact point 40 in the switch and the two elements 22 and 26 connect to the contact 41. The element 26 connects to the contact 39.

When the switch is in the position shown at A, no current passes. When the parts are as shown at B, the two elements 22 and 26 are in parallel and maximum heat is given off. When the parts are as shown at C, the element 22 is cut out and the heater is giving off a medium amount of heat. In D the contacts 38 and 40 are connected and the current passes through both elements in series, resulting in a comparatively low heating effect of the two elements.

The cap 9 of the heater may be removed and a toaster such as shown in Figs. 3 to 7 inclusive substituted. I prefer to form this toaster of a lower metal disk 45 having a circumferential flange 46, an upper metal disk 47 having a circumferential flange 48 extending down over the flange 46, and a series of cross bars 49 of asbestos board or other good non-conducting material. The lower disk has a series of struck-up tongues 50 (Figs. 3 and 6) extending beside the bars 49, while the upper disk is transversely slotted to form the cross strips 52 having flanges 53 which engage the sides of the bars 49. It will be noticed that these strips are severed about midway of their length to permit expansion and contraction. These bars 49 have notches 58 to receive the heating wire 54 which connects to the angle brackets 55 and 56 secured to two adjacent bars 49, which brackets support the coupling pins 57. This heating wire is preferably a coil placed in a zig-zag manner in the notches in the bars 49.

This toaster is formed to fit the flange 7 of the thimble 6 as shown in Fig. 3 and to fit the flange 3 of the base, as shown in Figs. 4, 5 and 7. The shell may be formed with an opening 59, as shown in Fig. 3 to admit a coupling whereby the toaster may be connected to a current source. In Fig. 7, the coupling pins are shown to be below the base 1 so as to be readily attached to a coupling block.

Striking up the tongues 50 leaves openings 60 of any desired size through which the hot air from the elements 22 and 26 may rise and assist in the toasting operation. These heating elements may be assisted by the wire 54 of the toaster in heating the room, unless the shell 5 is removed and the toaster is mounted on the base 1, as shown in Fig. 7. The upper surface of the bottom disk 45 is preferably burnished so that it will reflect the heat from the element 54 and thus insure maximum efficiency.

In Fig. 11 I have shown the line wires 62 and 63 connected to the ends of the toaster element 54 and the line wires 64 and 65 connected to the heater elements 22 and 26, in parallel. This is a diagram of the parts when the usual connector plugs or couplings are employed. In Figs. 9 and 10, however, I have shown diagrammatically how a double switch may be employed to conduct current to these heating wires.

In all the diagrams of both Figs. 9 and 10 the heating elements 22 and 26 are in parallel. Diagram E in Fig. 9 shows the switch open and no current in the heating elements. Diagram F shows one member 78 of the switch closing the circuit to the toaster element 54, while diagram G shows the other member 77 of the switch closing the circuit to the heater elements 22 and 26. It is apparent that when both members 77 and 78 engage contacts 68 and 69 respectively that the toaster and heating elements will all be in parallel and a maximum heating effect will be had. Diagram H shows the switch member 78 extending across to contact 68 which results in the two heating elements 22 and 26 being in series with the toaster element 54, resulting in low heat for all three.

Fig. 10 again comprises four diagrams in which one end of each of the three heating elements is connected to the contact 74, the other end of the two heater elements 22 and 26 connecting to the contact 75 while the other end of the toaster element 54 connects to the contact 73 and to the line wire 66. Diagram I shows the switch open and diagram K shows both members of the switch closing circuits to place all elements in parallel and therefore receiving maximum current. When the switch member 78 engages contact 74 and the member 77 is free, current passes to the toaster wire 54 alone. Diagram M shows the toaster element in series with the heater elements.

The toaster wire 54 preferably receives the same amount of current as the wires 22 and 26 together when the switch is in the position indicated in Fig. 10, K. As a result the wire 54 will be heated to a red heat while the wires 22 and 26 are still black and non-radiant. The upper surface of the bottom plate 45 of the toaster is therefore polished so it will reflect the radiant heat waves. This perforated screen permits the heated air to pass upward. The wires 22 and 26 may be said to generate convection currents of air which pass up through the perforated plate 45. The wires below and above the plate 45, therefore, generate convection currents of air combined with radiant heat waves.

The details of construction, the proportions of the parts and the arrangement of the wiring and switch members may all be changed by those skilled in the art without departing from the spirit of my invention as set forth in the following claims.

I claim:—

1. In a heater, the combination of a supporting frame comprising pairs of vertical strips of non-conducting material having notches along their outer vertical edges, two heating wires wound on said strips, conductor wires leading to a current source, and a switch to connect the heating wires to the conductor wires in series or in parallel.

2. In a heater, the combination of metal frames consisting of two flat arms, vertical supporting strips of non-conducting material attached to said frames and having notches along their outer vertical edges, additional strip attached to one of said frames in edge-to-edge engagement with each of the first named strips and also having notches along its outer edge, heating wires wound on the outer and on the inner sets of strips respectively, and a switch to control the current to the wires.

3. In a heater, a base having an inner cylindrical flange, a shell fitting the flange, a thimble fitting said shell and having an inner cylindrical flange, said flanges having substantially the same internal diameter, and an electric heating element within the shell.

4. In a heater, a base having an inner cylindrical flange, a shell fitting the flange, a thimble fitting said shell and having an inner cylindrical flange, said flanges having substantially the same internal diameter, an electric heating element within the shell, and a toaster adapted to fit within either of said flanges.

5. In a combined heater and toaster, the combination of a base, a shell, a heating element, a support for said element mounted in the shell, a toaster mounted in the upper end of the shell and embodying a heating element, conductor wires leading to a current source, and a switch to connect said elements to the current source in series or in parallel.

6. In a heater, a base, a shell and a wire support within the shell comprising upright strips, wires wound on said strips, a switch, and supporting bars for the switch attached to a plurality of said strips.

7. In a heater, the combination of supports of non-conducting material consisting of pairs of vertical strips, the strips of each pair being in the same plane, metal frames to detachably secure the strips in position, and resistance wires mounted on said strips, the outer strips constituting a support which telescopes on the inner strips.

8. In a heater, the combination of resistance wires, supports therefor, and means for detachably securing the strips together so as to permit the supports being telescoped.

9. In a heater, the combination of a toaster coil and a plurality of heater coils adapted to together receive the same amount of current as the toaster coil so that the toaster coil will become radiant while the heater coils remain non-radiant.

10. In a heater, the combination of a shell and a perforated diaphragm therein, the upper surface of the diaphragm being polished to reflect radiant heat, a coil mounted above the diaphragm adapted to generate radiant heat, and a coil mounted below the diaphragm adapted to create convection currents of air.

11. The combination of a disk having a polished upper surface and a series of struck-up tongues, a series of supporting bars of non-conducting material positioned by said tongues, an electric heating element mounted in said bars so as to constitute a zig-zag path for the current and occupying substantially the entire upper surface of the disk, said disk having a marginal cylindrical flange, a cylindrical band fitting said cylindrical flange on the disk and having an inwardly extending upper edge, and channel bars receiving the upper edges of said non-conducting bars and extending parallel to each other across the space within the flange on said cylindrical band.

12. In a heater, the combination of a disk having a polished upper surface, a series of struck-up tongues and a cylindrical flange, a series of supporting bars of non-conducting material positioned by said tongues, an upper disk slitted to constitute channel bars whose sides engage both sides of the non-conducting bars, said upper disk having a down-turned flange positioned by the upturned flange on the first named disk, and an electric heating element mounted in said bars.

13. In a heater, the combination of a cylindrical shell, a perforated base and a perforated top for the shell, a heat resisting element and a support for the same within the shell, and a heat reflecting coating of aluminum paint on the interior surface of the shell.

ARTHUR H. HAPPE.